United States Patent [19]

Harvey, II et al.

[11] 4,239,740

[45] Dec. 16, 1980

[54] PRODUCTION OF HIGH PURITY SILICON BY A HETEROGENEOUS ARC HEATER REDUCTION

[75] Inventors: Francis J. Harvey, II; David F. Ciliberti; Thomas N. Meyer, all of Murrysville; Maurice G. Fey, Pittsburgh, all of Pa.

[73] Assignee: Westinghouse Electric Corp., Pittsburgh, Pa.

[21] Appl. No.: 42,474

[22] Filed: May 25, 1979

[51] Int. Cl.³ .................. C01B 33/02; C01F 11/20; C01D 3/00
[52] U.S. Cl. .................................. 423/350; 204/164; 423/497; 423/499
[58] Field of Search .................. 423/350, 497, 499; 204/164

[56] References Cited

U.S. PATENT DOCUMENTS

| 2,941,867 | 6/1960 | Maurer | 423/350 X |
|---|---|---|---|
| 4,102,764 | 7/1978 | Harvey et al. | |
| 4,102,765 | 7/1978 | Fey et al. | 423/350 X |
| 4,102,766 | 7/1978 | Fey | |
| 4,102,767 | 7/1978 | Mazelsky et al. | |
| 4,102,985 | 7/1978 | Harvey | |
| 4,107,445 | 8/1978 | Wolf et al. | |

Primary Examiner—Jack Cooper
Attorney, Agent, or Firm—L. P. Johns

[57] ABSTRACT

A process for converting silicon intermediates to high purity silicon by an arc heater characterized by the steps of preliminarily reacting gaseous silicon intermediate, such as a silicon halide, with a metal reductant, such as sodium, to form preliminary reaction products including small solid silicon particles and droplets of salt of the metal reductant, at temperatures below the boiling point of the metal reductant, subsequently heating the reaction products to temperatures above said boiling point in an arc heater chamber to convert the reaction products to droplets of silicon to merge and form larger silicon droplets, and thereafter separating the mixture of silicon droplets and salt vapor.

5 Claims, 5 Drawing Figures

PRODUCTION OF HIGH PURITY SILICON BY A HETEROGENEOUS ARC HEATER REDUCTION

This invention was conceived during performance of work under Contract No. DOE/JPL 954589 for the National Aeronautic and Space Administration.

CROSS REFERENCE TO RELATED APPLICATIONS

This application is related to the copending applications of F. G. Arcella, et al, Ser. No. 841,409, filed Oct. 12, 1977; M. G. Fey, et al, Ser. No. 837,655 filed Sept. 29, 1977; and M. G. Fey, et al, Ser. No. 848,885, filed Mar. 9, 1978.

BACKGROUND OF THE INVENTION

1. Field of the Invention

This invention relates to a process for producing high purity silicon.

2. Description of the Prior Art

The wide-spread use of silicon solar cells for terrestrial power generation is limited at the present time primarily because of high costs. These high economics can be substantially reduced by developing alternative, low costs manufacturing processes used for the production of silicon solar arrays including the step of processing raw materials to produce high purity liquid silicon. Of several known processes for producing high purity silicon in a high capacity and low cost manner, a key step is the reduction of a silicon halide by a suitable metal reductant to produce liquid silicon and a gaseous halide of the reductant. The energy required for the reduction is provided by an arc heater which may be of the self-stabilizing, alternating current type as described in U.S. Pat. Nos. 3,705,975 and 3,832,519.

SUMMARY OF THE INVENTION

In accordance with this invention there is provided a process for producing high purity silicon in a heterogeneous manner comprising the steps of providing an arc heater having a process for producing high purity silicon comprising the steps of providing an arc heater having tubular electrodes axially spaced of each other and forming an arc chamber communicating with an upstream reaction chamber and with a downstream thermal treatment chamber, striking an electric arc in an axial gap between the electrodes, introducing through the axial gap an arc gas selected from the group consisting of hydrogen and a mixture of hydrogen and a inert gas to provide an elongated arc stream extending into the arc chamber, feeding into the upstream reaction chamber a quantity of a metal reductant selected from the group consisting of an alkali metal and an alkaline-earth metal, at a temperature range between the melting point and the boiling point of the metal reductant, feeding into the upstream reaction chamber a quantity of silicon halide to prereact with the metal reductant to produce reaction products including small solid silicon particles and droplets of salt of the metal reductant, flowing the reaction products through the arc heater to convert the reaction products into a mixture including droplets of silicon and salt vapor, flowing the mixture through the thermal treatment chamber to cause the droplets to merge into larger silicon droplets, the temperatures in the arc chamber and downstream treatment chamber being greater than the boiling point of the salt, wherein the reductant metal is preferably sodium, the silicon halide is silicon tetrachloride, the mixture including vapors of sodium and silicon tetrachloride which vapors interact to form elemental silicon which merges with other silicon droplets to form larger silicon droplets, and separating the mixture of silicon droplets and salt vapor.

The advantage of the process of this invention is the production of collectable silicon droplets which have a minimum contact with materials of construction, and are reduced at a lower temperature range.

DESCRIPTION OF THE PREFERRED EMBODIMENT

In accordance with this invention the process for producing high purity silicon comprises the steps of:

(a) providing an arc heater having tubular electrodes axially spaced of each other and forming an arc chamber communicating with an upstream reaction chamber and with a downstream thermal treatment chamber, (b) striking an electric arc in an axial gap between the electrodes, (c) introducing through the axial gap an arc gas selected from the group consisting of hydrogen and a mixture of hydrogen and an inert gas to provide an elongated arc stream extending into the arc chamber, (d) feeding into the upstream reaction chamber a quantity of a metal reductant selected from the group consisting of an alkali metal and an alkaline-earth metal at a temperature range between the melting point and boiling point of the metal reductant (such as sodium), (e) feeding into the upstream reaction chamber a quantity of silicon halide (such as silicon tetrachloride) to prereact with the metal reductant to produce reaction products including small solid silicon particles and droplets of salt of the metal reductant, (f) flowing the reaction products through the arc heater to convert the reaction products into a mixture including the droplets of silicon and salt vapor, and (g) flowing the mixture through the thermal treatment chamber to cause the droplets to merge with larger silicon droplets, and separating the mixture of silicon droplets and salt vapor.

Figure 1:
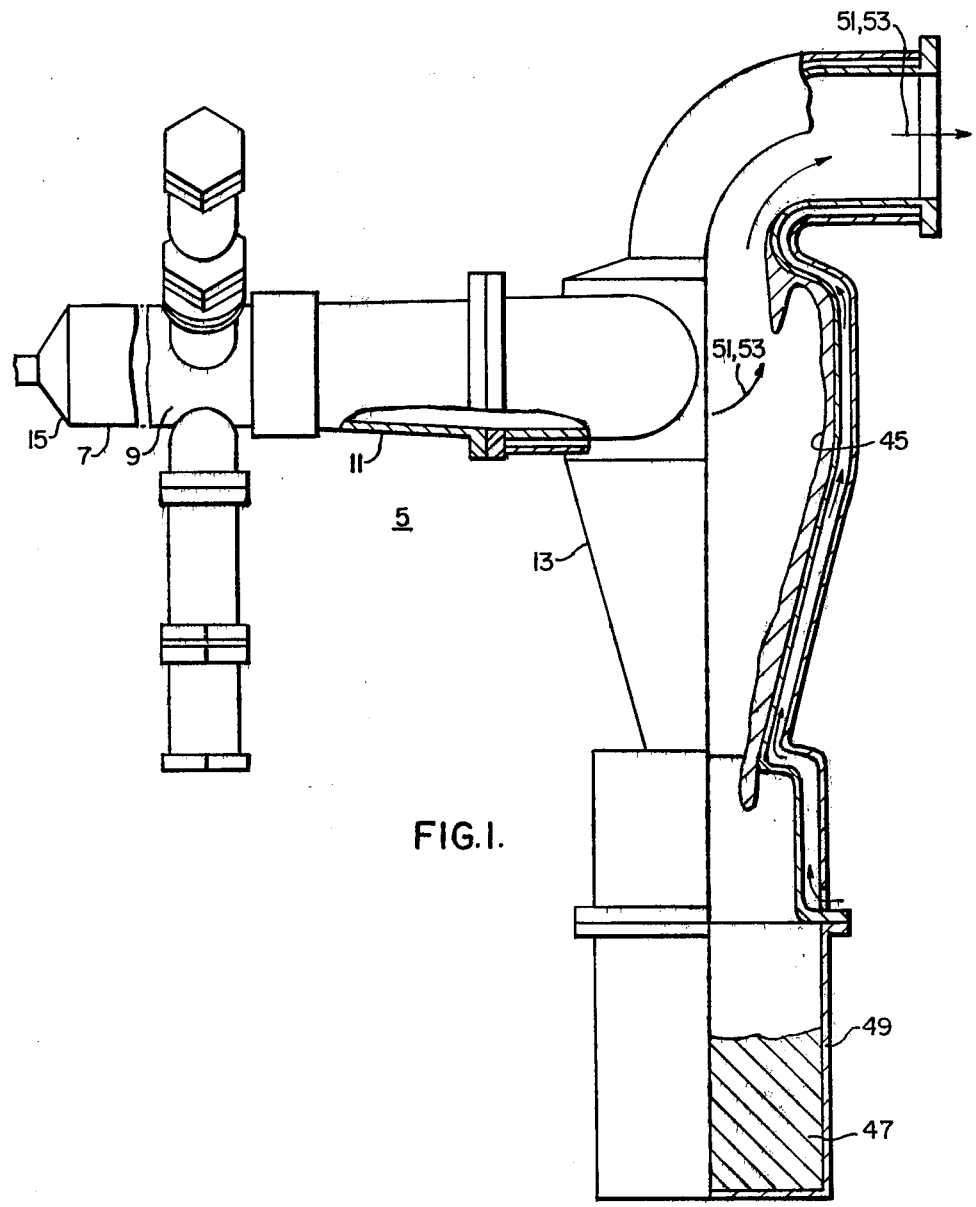
FIG. 1 is an elevational view partly in a section showing the apparatus of this invention.

In FIG. 1 an apparatus is generally indicated at 5 for performing the process of this invention. It comprises a reaction section or chamber 7, and arc heater section 9, a thermal treatment section 11, and a separating section 13.

Figure 2:
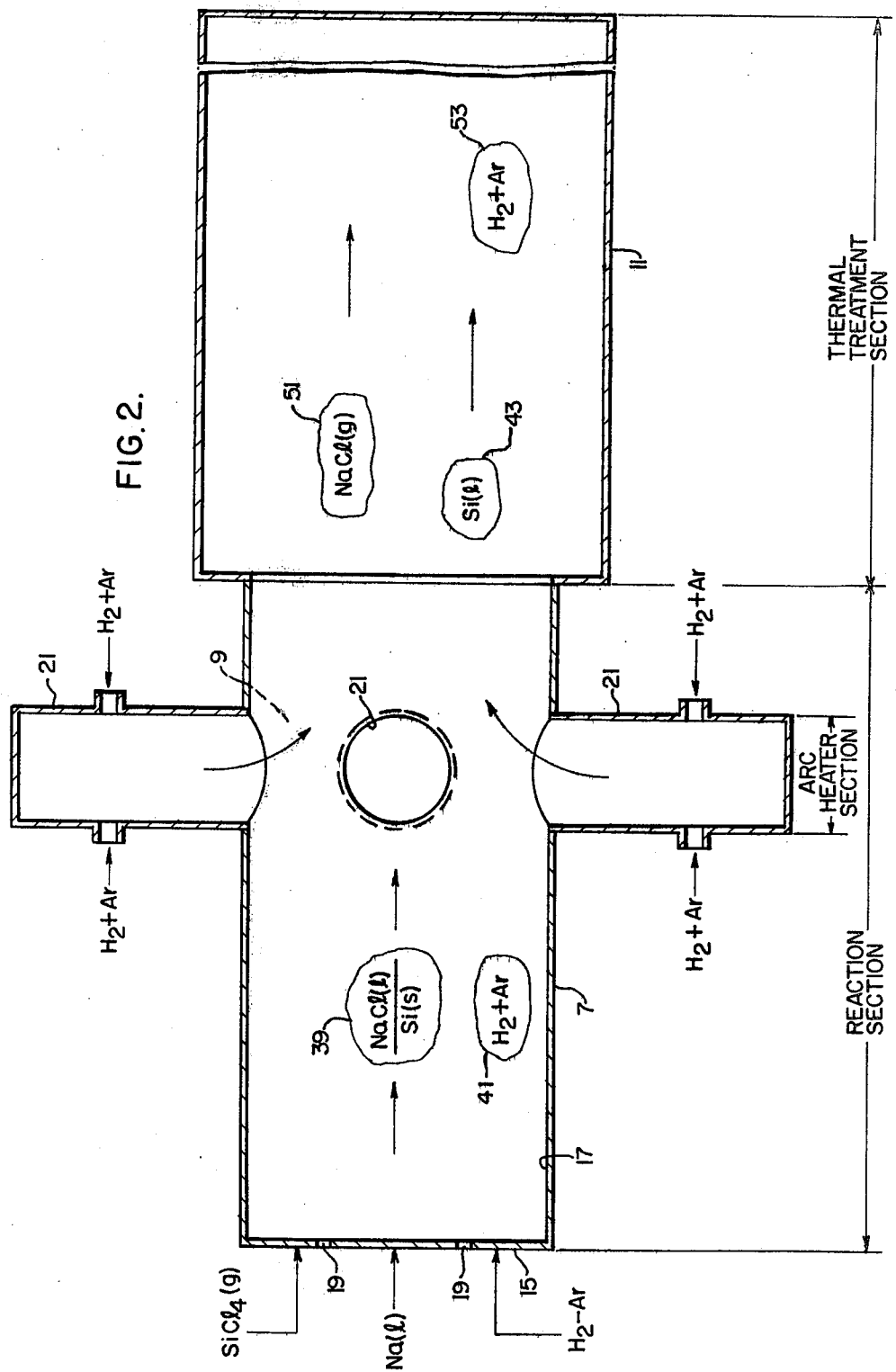
FIGS. 2, 3, 4 are schematic views showing sequential stages of reaction between the reactants in three sections of the process.
Figure 3:
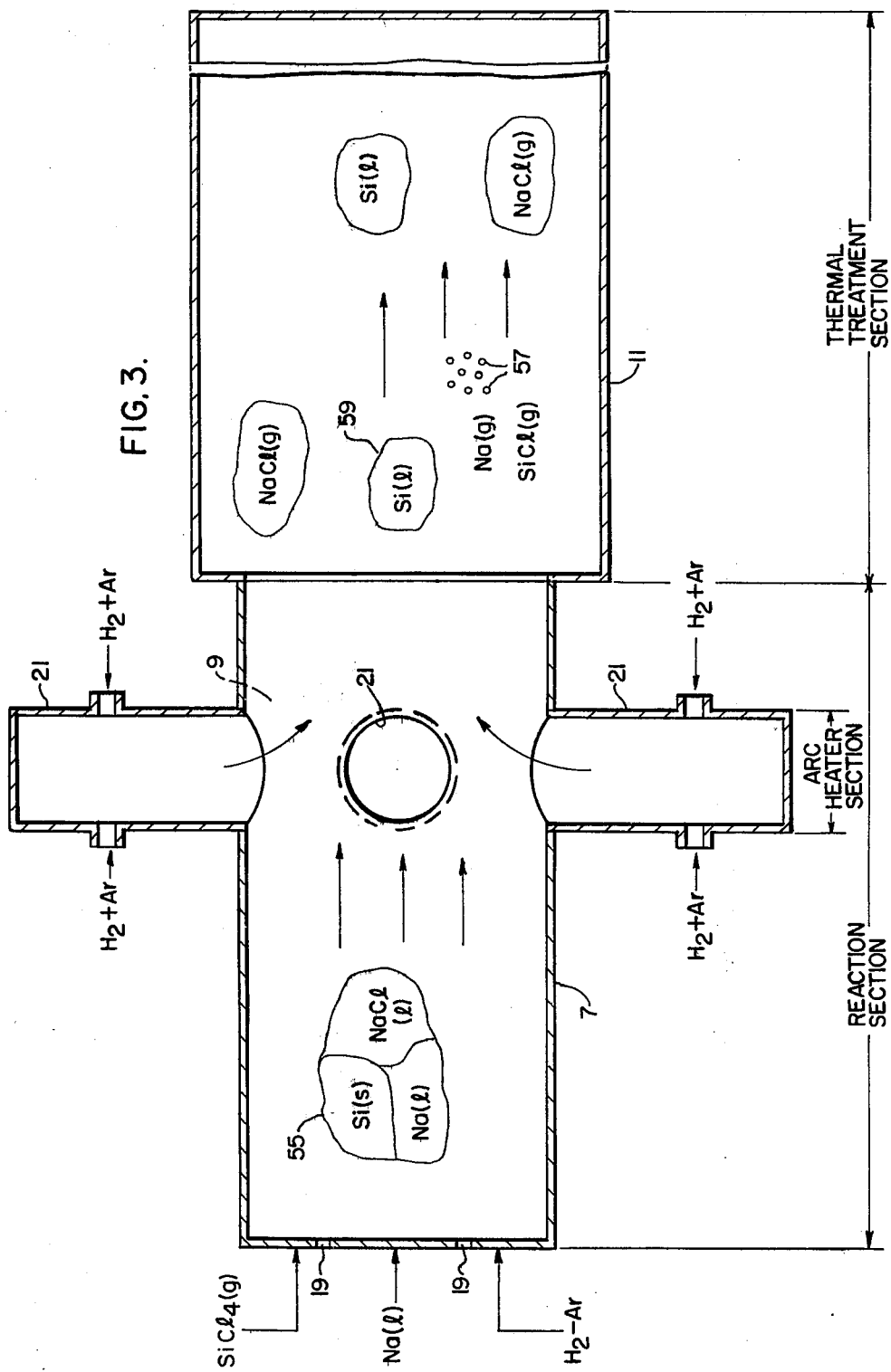
Figure 4:
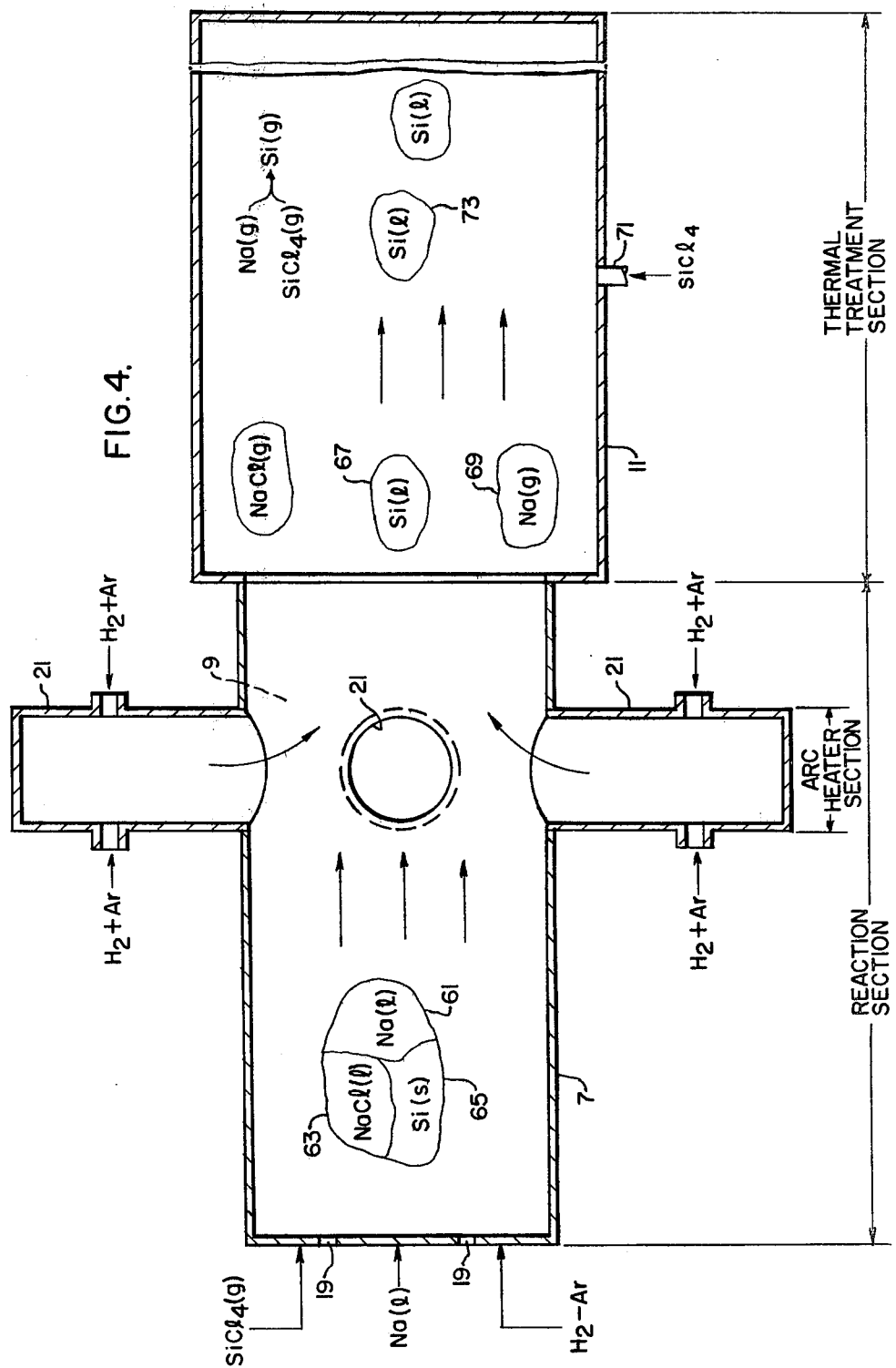

As shown more particularly in FIGS. 2, 3, and 4 the reaction section 7 is a tubular member having an end wall 15 and forming a reaction chamber 17 which is upstream of the arc heater section 9. A plurality of similar spaced nozzles or inlets 19 are disposed in the end wall 15 by which materials for the process of this invention are introduced. Those materials include (1) gaseous silicon halide, such as silicon tetrachloride, (2) a metal reductant selected from a group consisting of an a alkali metal and an alkaline-earth metal, such as liquid sodium, and (3) a carrier gas, such as helium, argon, or a mixture thereof. The reaction chamber 7 communicates with the arc heater section or chamber 9 which serves as a manifold for a plurality, such as three, similar arc heaters 21. In turn, the arc heater chamber 9 communicates with the thermal treatment section 11 which is downsteam of the arc heaters 21 in which turn communicates (FIG. 1) with the separating section 13.

Figure 5:
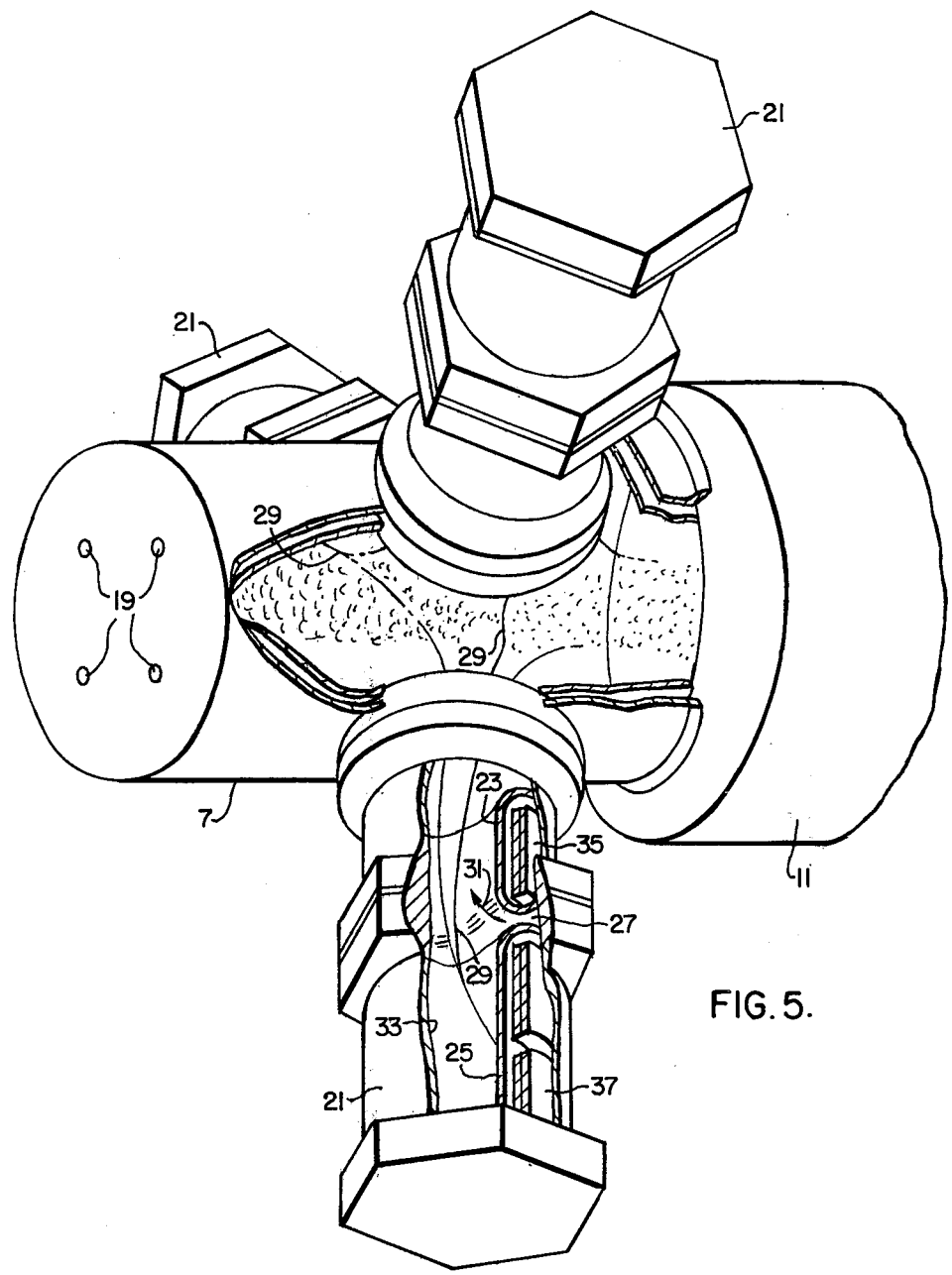
FIG. 5 is a schematic view with the broken away portions showing a three phase arc heater system.

As shown in FIG. 5 one or more and preferably three arc heaters 21 are similar in construction and operation to that disclosed in U.S. Pat. No. 3,765,870, entitled "Method of Direct Ore Reduction Using a Short Gap Arc Heater" of which the inventors are Maurice G. Fey and George A. Kemeny. Because of the full disclosure in that patent, the description of the arc heater 21 is limited herein to the basic structure and operation. The arc heaters 21 (FIG. 5) are each a single phase, self-stabilizing AC device capable of power levels up to about 3500 kilowatts, or up to about 10,000 kilowatts for the three phase plant insulation. In the practice of this invention, it is preferred that the three arc heaters be provided, one for each of the three phases of the AC power supply.

The arc heater 21 has two annular copper electrodes 23, 25 which are spaced at 27 about one millimeter part to accommodate a line frequency power source of about 4 kV. An arc 29 occurs in the space or gap 26 and incoming feed stock gas 31 immediately blows the arc 29 from the space into the interior of the arc chamber 33. The feed stock gas 31 must be compatible with the silicon and selected from the group consisting of an inert gas, hydrogen, and mixtures thereof. The arc 29 rotates at a speed of about 1000 revolutions per second by interaction of the arc current (several thousand amps AC) with a DC magnetic field set up by externally mounted field coils 35, 37. The velocities yield a very high operating efficiency for equipment of this type and the elongated arc 29 is ultimately projected by the gas into the arc heater chamber 9 as well as into the thermal treated section 11. Feed stock material is introduced through the inlets for nozzles 19, which are upstream of the arc heaters 21.

The reacting materials are halides of silicon, a reductant metal of the alkali or alkaline-earth materials, and hydrogen. Although the preferred silicon halide is silicon tetrachloride, any other halide, such as silicon tetrabromide, may be used.

The materials react in accordance with the following formula:

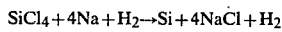
$$SiCl_4 + 4Na + H_2 \rightarrow Si + 4NaCl + H_2$$

The foregoing formula is exemplary of the number of possibilities available for producing high purity or solar cell silicon. The overall process can be carried out in one of three ways depending on the degree of conversion of reactants to products in the reaction section and the viability of a scavenging type, liquid silicon collecting mechanism. The latter mechanism involves the collection of ultra fine droplets of silicon by larger droplets.

In the first of the three methods (FIG. 2), if complete or nearly complete conversion occurs in the reaction section 7, that is, $SiCl_4(g)$ and $Na(l)$ to $NaCl(l)$ and $Si(s)$, then the subsequent treatment is a physical heat affectation involving melting and vaporization. In FIG. 2 molecules 39 of molecules including NaCl and Si as well as molecules 41 of molecules $H_2$ and Ar move through the reaction section in a temperature range between melting point (97.5° C.) and the boiling point (800° C.) of sodium. As the molecules 39 pass through the arc heater section 9 at the greatly elevated temperature sustained by the arcs 29 emanating from the several arc heaters 21, the molecules of NaCl(l) are vaporized off and become NaCl(g). Similarly the molecules of Si(s) become Si(l). Thereafter the liquid silicon droplets emerge at the exit end of the thermal treatment section 11. In the separating section 13, which is a typical cyclone separator, the molecules 43 if Si(l) are deposited centrifugally upon the walls of the section 13 to form a layer 45 of silicon which flows downwardly and collects at 47 in a receptacle 49. The molecules 51 of NaCl(g) and 53 of $H_2$ and Ar flow upwardly (l) and out of the top of the cycle separator 13.

The second method is shown in FIG. 3. If heterogeneous conversion of the reactants is low in the reaction section, and a scavenging collection mechanism is operable, the reactants can be added in a manner similar to the process of FIG. 2. But the reaction sequence is changed. A low heterogeneous conversion, as indicated by a multicomponent droplet 55 of Si(s), NaCl(l), and Na(l), in the reaction section 7 may occur of the formulation of a solid product skin on the droplet, or as a result of rapid droplet heating in the arc heater section 9, causing sodium vaporization and, consequently a homogeneous reaction between Na and $SiCl_4$.

Under these conditions the stream entering the thermal treatment section 11 consists of multicomponent droplets containing Si, NaCl, and large amounts of unreacted Na and a gas phase containing unreacted $SiCl_4$ and possibly fine particles and/or droplets of silicon. In the thermal treatment section 11, besides the melting vaporization of NaCl and the melting of Si, the unreacted sodium is vaporized and reacts with the remaining silicon chlorides in a homogeneous manner to produce fine droplets 57 of silicon. Subsequently the fine droplets 57 are collected by collisions with larger droplets 59 which were produced in a heterogeneous manner. The condensed phase produce of the thermal treatment is collectable droplets of silicon which can be separated from the product gas stream in the separating section 13.

The third method is illustrated in FIG. 4. If a heterogeneous conversion of the reactants is low in the reaction section 7 but a scavenging mechanism requires an unreasonably large thermal treatment section 11 to effectively collect the fine droplets of silicon, only a specified portion of the $SiCl_4$ is added in the reactor section 7. The amount of $SiCl_4$ added is such that it is essentially all converted into product. In the thermal treatment section 11, the unreacted Na molecule 61 is vaporized along with the melting of the molecules 63, 65 of the NaCl and Si and the vaporization of the NaCl. The product stream that emerges from the thermal treatment section 11 contains liquid silicon droplets 67 and a gas phase 69 containing sodium vapor has sufficiently high temperature. The remaining part of the $SiCl_4$ is added at inlet 71 in the section 11 near the exit end. The sodium vapor reacts with the added $SiCl_4$ gas in a homogeneous manner. The temperature of the gas stream is high enough so that the silicon produced is in the vapor state. As the stream cools, the gaseous silicon is then condensed on the liquid silicon droplets 67 by a diffusion process to form larger droplets 73 which are subsequently separated from the gas stream by inertial means in the separating section 13. For purposes of the collection of gaseous silicon, an additional length of cylindrical reactor may be added between the thermal treatment section 11 and the separating section 13.

In conclusion, the advantages of carrying out the arc heater reduction of a silicon halide by the metallic reductant in a heterogeneous manner rather than in a homogeneous manner are three-fold. First, the silicon is added in droplets that are large enough to be effectively separated from the product gas stream by inertial means in a reasonable sized reactor. Secondly, because the silicon droplets are suspended in a flowing gas, they do not come in contact with materials of construction until the final separation step and, consequently, the liquid silicon is of potentially higher purity due to the reduced contact time with construction materials. Finally, the reduction can be carried out at lower temperatures, that is, 1685° K. from the sodium reduction of $SiCl_4$, where the yield of liquid silicon is higher.

What is claimed is:

1. A process for producing high purity silicon comprising the steps of:
    a. providing an arc heater having tubular electrodes axially spaced of each other and forming an arc chamber communicating with an upstream reaction chamber and with a downstream thermal treatment chamber,
    b. striking an electric arc in an axial gap between the electrodes,
    c. introducing through the axial gap an arc gas selected from the group consisting of hydrogen and a mixture of hydrogen and an inert gas to provide an elongated arc stream extending into the arc chamber,
    d. feeding into the upstream reaction chamber a quantity of a metal reductant selected from the group consisting of an alkali metal and an alkaline-earth metal at a temperature range between the melting point and boiling point of the metal reductant,
    e. feeding into the upstream reaction chamber a quantity of silicon halide to prereact with the metal reductant to produce droplets of reaction products including solid silicon particles mixed with liquid metal salt co-product and unreacted liquid metal reductant,
    f. flowing the reaction products through the arc heater at a temperature greater than the boiling point of the salt to convert the reaction products into a mixture including the droplets of silicon, metal salt vapor, gaseous metal reductant and silicon halide,
    g. flowing the mixture through the thermal treatment chamber to effect the reaction between vaporized unreacted metal reductant and silicon halide to produce small droplets of silicon which merge with larger silicon droplets from step (e), and
    h. separating the mixture of silicon droplets and salt vapor.

2. The process of claim 1 wherein the steps (d) and (e) are performed at a temperature range between the melting point and boiling point of the metal reductant.

3. The process of claim 2 wherein the reductant is sodium.

4. The process of claim 2 wherein the halide is chlorine.

5. The process of claim 4 wherein the reductant is sodium and the silicon halide is silicon tetrachloride.

* * * * *